United States Patent [19]
Sousan

[11] 3,834,710
[45] Sept. 10, 1974

[54] ELECTRONIC RANDOM PREDICTOR

[76] Inventor: Andre Levy Sousan, Avenue De Suffren 20, Paris, France 75015

[22] Filed: June 4, 1973

[21] Appl. No.: 366,656

[52] U.S. Cl. .......... 273/138 A
[51] Int. Cl. .......... A63b 71/06
[58] Field of Search .......... 273/138 A, 141 A, 135 A, 273/136 A, 1 E; 272/8 D, 8 P

[56] References Cited

UNITED STATES PATENTS

| | | | |
|---|---|---|---|
| 3,659,853 | 5/1972 | Church | 273/138 A |
| 3,592,473 | 7/1971 | Jernakoff et al. | 273/138 A |
| 3,709,499 | 1/1973 | Lukens, Jr. | 273/138 A |
| 3,735,982 | 5/1973 | Gerfin | 273/138 A X |

FOREIGN PATENTS OR APPLICATIONS

| | | | |
|---|---|---|---|
| 1,107,552 | 3/1968 | Great Britain | 273/138 A |
| 1,178,302 | 1/1970 | Great Britain | 273/138 A |

OTHER PUBLICATIONS

Popular Electronics, September 1967, pp. 29–34. "Spots Before Your Eyes."

*Primary Examiner*—Anton O. Oechsle
*Assistant Examiner*—Arnold W. Kramer
*Attorney, Agent, or Firm*—Lindenberg, Freilich, Wasserman, Rosen & Fernandez

[57] ABSTRACT

A random predictor electronic system has groups of lights with each group having at least two differently colored light sources. A logic circuit has its output connected to the groups of lights. A first oscillator controls a binary stage electronic counter with the output of the counter being one input of the logic circuit. A second oscillator powered by a source of electric potential has its output being a second input of the logic circuit. A player actuated manually positionable switch is connected to the potential source and to a flip-flop with the switch in a first position triggering one side of the flip-flop and in a second position triggering the second side of the flip-flop. The output of the first side of the flip-flop controls the first oscillator and the output of the second side of the flip-flop being a third input of the logic circuit, whereby on positioning the switch in the first position the first oscillator drives the counter and the plurality of groups of lights are not illuminated and on positioning the switch in the second position at least one of the light groups is illuminated wherein at least one of the colored light sources in the illuminated light group is illuminated in either a steady state mode or a flashing mode, or at least two of the colored light sources in the illuminated light group are illuminated in an alternating blinking mode.

7 Claims, 5 Drawing Figures

ELECTRONIC RANDOM PREDICTOR

BACKGROUND OF THE INVENTION

This invention relates to devices used for amusement, and more particularly, to an electronic predicting device.

Man has often wished that he had some means of foretelling the results that would follow a course of action to be undertaken by him, or receive some guidance on a proposed course of action, or effectively, to some extent determine what lies ahead in the future. To this end, there have been provided such devices as Tarot cards, tea leave readings, etc. A system devised by the ancient Chinese is known as the I Ching system. There is worldwide literature available on this system. What makes this system unique, is that it appears to be based entirely on a binary system.

The basic principles of I Ching are called "Yin" and "Yang" representing feminine and masculine for example, or even and odd, or darkness and lightness.

One representation of Yin is a broken line (--) and for Yang an unbroken line (-). Obviously, these can be represented by the binary digits "0" for Yin, and "1" for Yang.

The further extension of Yin and Yang is a great or old Yang ( ), the great or old Yin ( ), the young or small Yang ( ), and the young or small Yin ( ). These symbols can be represented by four possible permutations of two bits, respectively: 11, 00, 01, and 10. The old Yang, or 11, is called a changing line by I Ching principles, and changes itself into the young Yin or 10. The old Yin, or 00, is also changing to a young Yang, or 01.

Taking three broken or unbroken lines together, I Ching derives eight trigrams. These eight trigrams can be represented by the eight possible permutations of three bits, ranging from 000 to 111. Since each of these lines can be either young or old, the eight permutations can become 64 permutations. Six bits are all that is needed to represent all of these permutations.

I Ching further teaches the association of the trigrams to form hexagrams. Again, there are $8^2 = 64$ permutations of trigrams and taking the changing lines into consideration, there are $2^6 \times 2^6 = 4{,}096$ total combinations, that is 64 basic combinations, each one capable of changing into itself plus the 63 others.

For fortune telling using the I Ching method, yarrow stalks, wood sticks, or coins, are used to generate six lines which can be broken, unbroken, and changing or not. If the obtained hexagram has no changing lines, a text associated with it represents the answer to a question which is asked. If it has one or more changing lines, the first text is only part of the answer. A further text provides the second part of the answer and the hexagram obtained by changing simultaneously all the changing lines is associated with a text representing the last part of the answer. I Ching considers that this final hexagram represents the final outcome of the answer.

Methods taught by I Ching to generate the lines are such that all hexagrams have an equal probability of being drawn.

OBJECTS AND SUMMARY OF THE INVENTION

It is an object of this invention to provide an electronic circuit which operates along the principles of the I Ching system.

Still another object of this invention is to provide a novel electronic circuit arrangement which can be used for entertainment.

These and other objects of the invention may be achieved by an arrangement whereby when a person thinks of a question for which he desires an answer, or some guidance on a proposed course of action, he pushes a button which causes an oscillator to drive a counter. When the question has been completed, the button is pushed again, whereby the counter is caused to stop and a light appears in one or more of three windows, with a color and a state which can be steady, alternating or flashing, from which an answer to the question or indication of problem, may be decoded.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
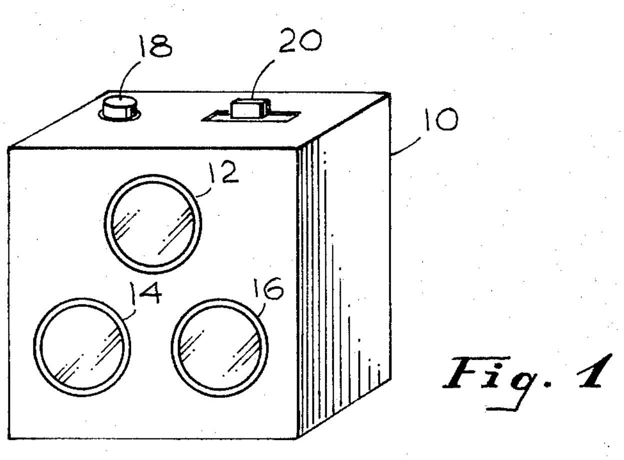
FIG. 1 is an isometric view illustrative of the appearance of an embodiment of this invention.

In FIG. 1 there may be seen a container 10, which includes the circuitry which is utilized in this invention. On a surface of the container are three decorated openings or windows respectively 12, 14 and 16, through which light shines from the inside of the box in the manner which will be subsequently described herein. On the top of the box may be found a power on switch 18 and an operating switch 20.

Figure 2:
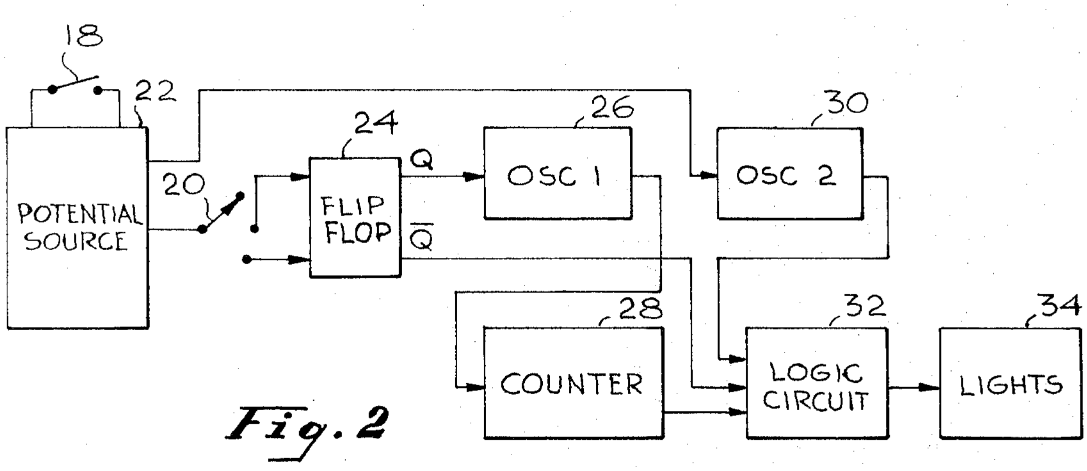
FIG. 2 is a block schematic diagram of an embodiment of the invention.

FIG. 2 illustrates a block schematic diagram of an embodiment of the invention. It includes a potential source 22, such as batteries. The potential source is enabled to apply power to the remainder of the circuit when the power on switch 18 is operated. A switch 20 is a three position switch which is operated to a first position to apply a signal from the potential source 22 to a flip-flop 24, to drive it to its set state at which its Q output is high. The switch 20, when operated to its second position, drives the flip-flop 24 to its reset state at which the Q output is high. When the Q output of the flip-flop 24 is high, an oscillator 26, which may be termed the counter drive oscillator, is enabled and provides an output which can drive a binary counter 28.

When the potential source 22 is enabled, a second oscillator 30 is enabled to oscillate, and this continuously provides pulses, designated as $F_1$, $F_2$, and $F_2$ pulses to a logic circuit 32. The output of the counter is also applied to the logic circuit 32. Also, the Q output of the flip-flop 24 is connected to the logic circuit 32.

When the switch 20 is moved to its second position, it resets flip-flop 24 whereby its Q output goes high. At this time, the oscillator 26 ceases driving the counter 28. At this time, the logic circuit 32, in response to the output received from the second oscillator 30, Q output of the flip-flop 24, and the count of the counter 28, causes predetermined ones of the lights 34 to become illuminated with a color and mode of illuminaton which can be decoded.

In summary therefore, and as previously indicated, to operate the system after the power is turned on, and the user commences to think of the question or proposed course of behavior he wants answered, the switch 20 at that time is actuated, setting the flip-flop in its Q position. This causes the counter 28 to run. No lights appear. Thereafter, when the question to be answered has been completed, the switch 20 is actuated to reset flip-flop 24. Counter 28 stops counting and the lights are illuminated with a color and mode from which an answer to the question asked may be decoded.

It was previously pointed out that there were 4,096 total combinations or 64 basic combinations, each one capable of changing into itself plus the 63 others. Consequently, a $2^{12}$ bit electronic counter could be used and each group of two bits, corresponding to the broken, unbroken, broken changing and unbroken changing lines could be thereafter decoded.

It has been determined that in accordance with this invention, that 64 required combinations can be obtained using a maximum of three color states displayed at the same time, through for example, the windows 12, 14 and 16 in FIG. 1, using two colors for each window and each light assuming a state or mode of being lit, steady, flashing on and off at a constant frequency, or alternating between the two colors which are capable of being displayed through a window. By way of example, the two colors can be red and green. The steady state shall hereafter be designated by S. The flashing state shall hereafter be designated by F. The alternating state shall hereafter be designated by A. The lights need not all be on simultaneously. For decoding the display shown in the three windows, Table 1 that follows is provided.

TABLE 1

| COLORS | STEADY | FLASHING | NO. OF WINDOWS DISREGARDING STATE | ALTERNATING |
|---|---|---|---|---|
| Green | Favorable | Opportunities to grasp | 1. Moderate 2. Noticeable 3. Signficant | Seriously ponder conclusions and actions to influence outcome |
| Red | Unfavorable | Risks to Consider | | |

To illustrate the use of the table, one thinks of a question, or of a proposed mode of behavior and then operates the machine as indicated. If the lights in the windows are green and steady, the proposed course of action if only one window is illuminated, is moderately favorable; if two windows are illuminated, is noticeably favorable; and if three windows are illuminated, is significantly favorable. The same rationale applies when the red light is on steady except that it is interpreted as unfavorable.

Should the green light come on in a flashing mode, then there are opportunities to grasp, and these are moderate, noticeable or significant, as determined by the number of windows in which the green light is flashing. Similarly, if the red light is flashing, except of course as indicated, there are risks which are moderate, noticeable or significant, as determined by the number of flashing windows.

Should there be an alternating illumination of the windows, that is, they alternate between the green and the red light, then the proposed answer or course of action should be seriously pondered before proceeding.

In order to validly associate the display selected and I Ching, exactly 64 combinations must be obtained. Then, by activating the invention a first and then a second time, if desired, one can get one of 64 new combinations, consequently thereby generating all of the 4,096 possible I Ching combinations. By selecting the color code, using four states and three windows, one can represent $4^3 = 64$ different combinations. Obviously, the "non-illuminated" state is desired to be avoided since this can be confused with a malfunction of the product.

This invention uses a $2^6$ binary counter which employs six flip-flops. Dual light emitting diodes are used to generate the green and red colors but if desired, single light-emitting diodes can be used.

Table 2 reproduced below, illustrates the selection of lights and light states or light modes in accordance with the counts of the counter 28 which carry out the principles of I Ching. There are six flip-flops in the counter, and they are considered in groups of two, or two at a time. The states of the groups of flip-flops are indicated under the "bits" column. The states of the lights in the windows or openings are indicated under the respective columns, $W_1$, $W_2$, and $W_3$. $W_1$ is the window 12, $W_2$ is window 14, and $W_3$ is window 16. The letters R and G are used to represent the colors, the S represents steady state, the F represents flashing, and the letter A represents alternating. Finally, the O indicates no light.

TABLE 2

| BITS | $W_1$ | $W_2$ | $W_3$ |
|---|---|---|---|
| 11 | RF | A | A |
| 10 | RS | RS | RF |
| 01 | GF | GS | GF |
| 00 | GF | 0 | 0 |

To show how the table operates, if the first two bits of the first two stages of the counter are 11, the next two bits of the next two stages are 10 and the last two bits of the last two stages are 00, the window $W_1$ would show red flashing, window $W_2$ would show red steady, and window $W_3$ would not show any light. From the foregoing, it should be deduced that the first two stages of the counter have their outputs associated with window $W_1$, the second two stages of the counter have their outputs associated with window $W_2$ and the third two stages of the counter have their outputs associated with window $W_3$.

The oscillator for driving the counter may be any of the oscillator circuits which are well known in the art, which are enabled by the application of a signal from a flip-flop and disenabled when that signal no longer applies. Any of the well known oscillator circuits which operate at a frequency of on the order of 1,000 hertz can be employed, and therefore the detailed circuitry thereof is not believed required to be shown here.

Figure 3:
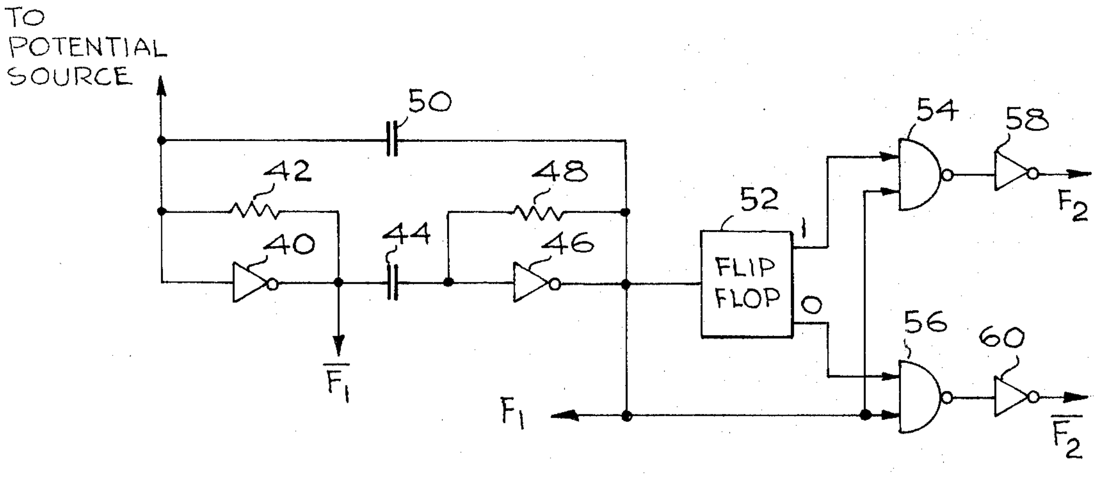
FIG. 3 is a circuit diagram of the oscillator 2 used to generate $F_1$, $F_2$ and $F_2$ pulses which are applied to the logic circuit of this invention.
Figure 4:
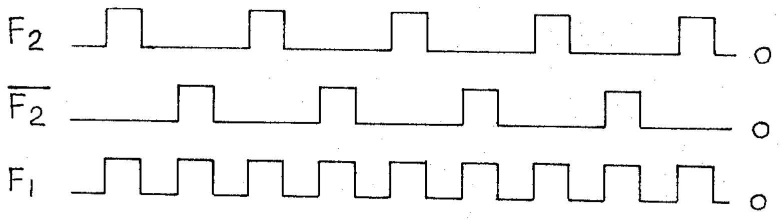
FIG. 4 is a waveform diagram illustrating the $F_1$, $F_2$ and $F_2$ pulses.

FIG. 3 shows the oscillator 2 arrangement for generating $F_1$, $F_2$ and $F_2$ pulses, and FIG. 4 shows the waveforms for these respective pulses. In FIG. 3, an inverter amplifier 40 has a resistor 42 connected between its input and output. Its output is applied to a capacitor 44, which serves to couple the output of the inverter amplifier 40 to the input of inverter amplifier 46. A resistor 48 is connected between the input and output of the inverter amplifier 46.

The output of the inverter amplifier 46 is connected back through the input of the inverter amplifier 40 through a capacitor 50. This output is also connected to drive a flip-flop circuit 52 between its 1 and 0 representative states. The output of inverter amplifier 46 is applied as one input to each of two NAND gates respectively, 54, 56. The output of inverter amplifier 46 also provides the $F_1$ pulse trains, which is represented in FIG. 4.

The 1 output of flip-flop 52 is applied as a second required input to NAND gate 54, and the 0 output of flip-flop 52 is applied as a second required input to NAND gate 56. The output of NAND gate drives an inverter amplifier 58, whose output constitutes the $F_2$ pulse wavetrain shown in FIG. 4. The output of NAND gate 56 drives an inverter amplifier 60, whose output constitutes the $F_2$ waveform shown in FIG. 4. It will be noted that $F_1$ has twice the repetitive frequency of $F_2$ and $F_2$, and also that the $F_2$ pulses are phase shifted by 180° from the $F_2$ pulses.

Figure 5:
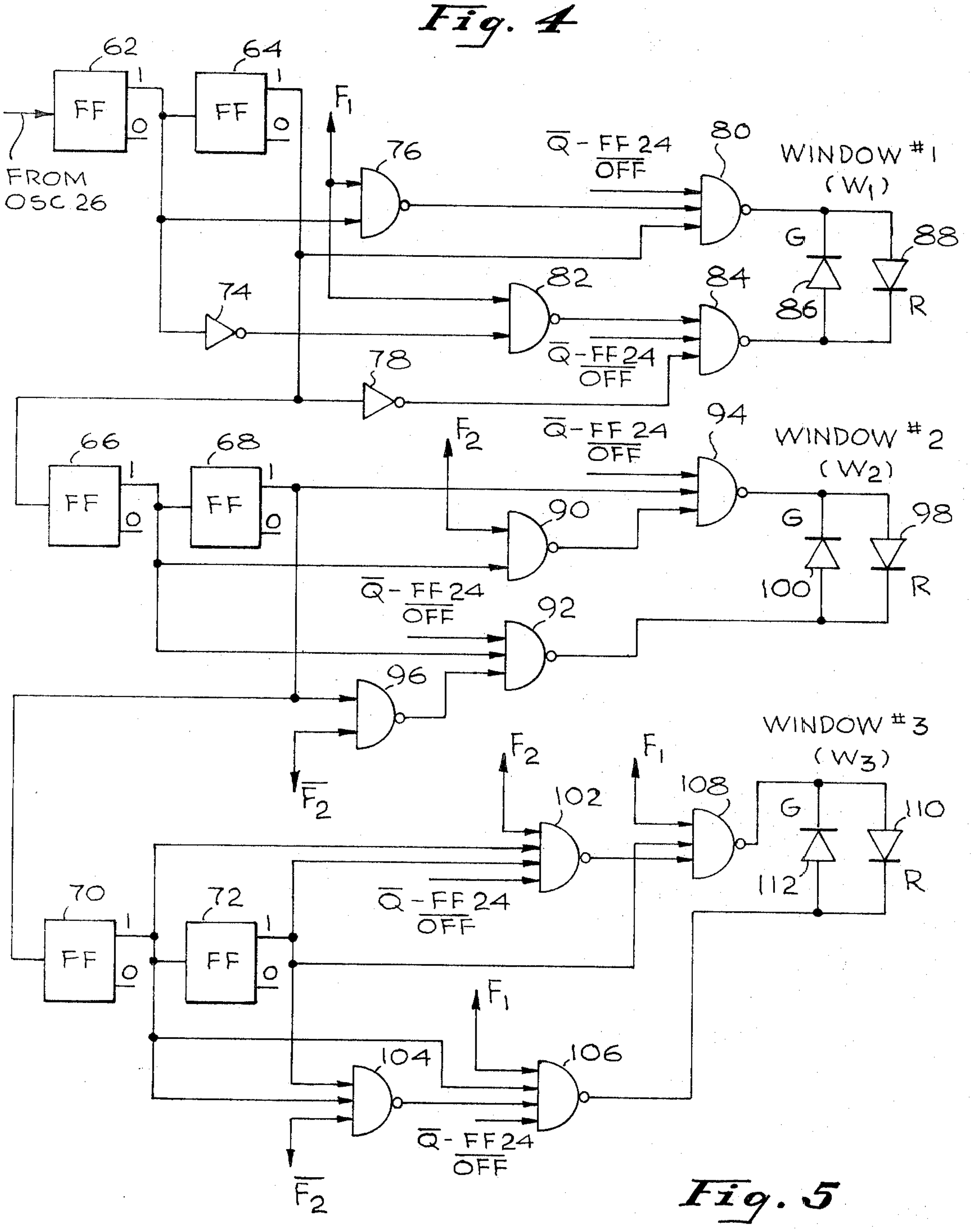
FIG. 5 is a combined schematic and circuit diagram illustrating the counter, the logic circuit and connections to the lights which are used in the embodiment of the invention.

FIG. 5 is a block, schematic circuit diagram of the counter 28, the logic circuits 32 and their connections to the lights 34. It was pointed out that the lights are light-emitting diodes which when current is flowing in one direction is applied thereto are red light-emitting and when current in an opposite direction is applied, are green light-emitting. It will be understood that separate lights may be employed if desired, and their connections to the outputs of the logic circuits may be made through the rectifiers which here represent the light-emitting diodes.

The counter consists of six flip-flop stages respectively, 62, 64, 66, 68, 70 and 72. The one output of each stage drives the succeeding flip-flop stage between each of its two stable states. The input to the first flip-flop stage 62 comprises the output of the oscillator 26.

It was pointed out that the respective three pairs of flip-flop stages are respectively associated with the three windows. The one output of flip-flop 62, besides driving flip-flop 64, is also applied to an inverter 74, and constitutes an input to a NAND gate 76. The one output of flip-flop 64 is applied to an inverter 78, and constitutes an input to a NAND gate 80. A second input to NAND gate 80 is the output of NAND gate 76. The output of inverter 74 constitutes an input to a NAND gate 82. The output of NAND gate 82 constitutes an input to a NAND gate 84.

$F_1$ pulses are applied to NAND gates 76 and 82 as their second required inputs. The third input to NAND gates 80 and 84, are the Q outputs from flip-flop 24. A green light-emitting diode 86 has its anode connected to the output of NAND gate 84 and its cathode connected to the output of NAND gate 80. A red light-emitting diode 88 has its anode connected to the output of NAND gate 80 and its cathode connected to the output of NAND gate 84.

Flip-flop 66 has its one output state besides being applied to drive flip-flop 68, applied as one input to NAND gates 90 and 92. A second input to NAND gate 90 is the $F_2$ output of the oscillator 30. A second input to NAND gate 92 is a Q output from flip-flop 24. The one output of flip-flop stage 68, besides driving flip-flop stage 70, is applied to the inputs to NAND gates 94 and 96. A second input to NAND gate 96 is an $F_2$ pulse. The output of NAND gate 96 constitutes the third required input to NAND gate 92. The output of NAND gate 90 constitutes a second input to NAND gate 94. The third input to NAND gate 94 is Q output of flip-flop 24. A red light-emitting diode 98 has its anode connected to the output of NAND gate 94 and its cathode connected to the output of NAND gate 92. A green light-emitting diode 100 has its anode connected to the output of NAND gate 92, and its cathode connected to the output of NAND gate 94.

The one state of flip-flop 70, besides driving flip-flop 72 is one input to a NAND gate 102, to a NAND gate 104, and a NAND gate 106. The one output of flip-flop 72 constitutes a second input to NAND gate 104 and 102, and constitutes one input to a NAND gate 108. A third input to NAND gate 102 is the $F_2$ pulse train. A fourth input to NAND gate 102 is the Q state of flip-flop 24.

An $F_2$ pulse constitutes the third input to NAND gate 104. NAND gate 106 has as its other two required inputs, an $F_1$ pulse train and a Q output of flip-flop 24. NAND gate 108 receives as a second input the output of NAND gate 102 and as a third input, the $F_1$ pulse train. The red light-emitting diode 110 has its anode connected to the output of NAND gate 108 and its cathode connected to the output of NAND gate 106, and the green light-emitting diode 112 has its anode connected to the output of NAND gate 106 and its cathode connected to the output of NAND gate 108.

To illustrate the operation of the circuit shown in FIG. 5, it will be assumed that the first pair of flip-flops 62, 64, rest in their 0,0 state, the second pair of flip-flops 66, 68 rest in the 1,0 state, and the third pair of flip-flops 70, 72 rest in the 1,1 state. NAND gate 82 is enabled each time an $F_1$ pulse is received. Its output is applied to NAND gate 84, which is also enabled since it is receiving the Q output from flip-flop 24 and the output of the inverter 78. Therefore, the green light-emitting diode 86 will be flashing on and off at the $F_1$ rate.

Considering the second pair of flip-flop stages, these represent 0,1 therefore, flip-flop 66 has its 1 output high and flip-flop 68 has its 0 output high.

Accordingly, while NAND gate 90 may be enabled, NAND gate 94 is not enabled since the input received from flip-flop 68 is low. However, NAND gate 92 has all of its inputs enabled (the output of NAND gate 96 being high) therefore, the red light-emitting diode will be on steady since the output of NAND gate 94 is high and the output of NAND gate 92 is low.

Flip-flops 70 and 72 have their 1 outputs high. NAND gate 102 will have an output which is oscillating from high to low at the rate of the $F_2$ pulse train. NAND gate 108, which is receiving both $F_1$ and $F_2$ pulse trains, as a result, will have an output which is oscillating from high to low at the rate of the $F_2$ pulses.

NAND gate 104 provides an output of the frequency and phase of $F_2$. Therefore, NAND gate 106 provides an output at the $F_2$ frequency and it and NAND gate 108 will alternately provide outputs at the $F_2$ frequency but out of phase. In other words, the output from NAND gate 108 goes low whenever an $F_2$ occurs, and the output from NAND gate 106 goes low whenever an $F_2$ occurs. As a result, window number 3 will display green and red alternately.

From the foregoing description, it is believed that it will be understood how the lights in the respective three windows will assume the other states depicted in Table 2 in response to the count in the counter. The states of the lights can then be interpreted or decoded from the information provided in Table 1.

When the power switch is opened, the display will stop. The predictor may be used again without turning off the power by resetting switch 20 to its starting position.

There has accordingly been described and shown herein, a novel and useful electronic arrangement whereby means of a colored light display, a positive, negative, neutral or caution oriented answer is indicated in response to a question asked by a human operator.

What is claimed is:

1. An electronic random predictor system comprising a counter means producing count signal outputs, player actuated means connected to said counter means for electrically actuating said counter means to count and to thereafter, when desired by said player, to cease counting and to produce at that time a count stopped signal, continuously operative oscillator means producing oscillation signal outputs, light means having different illumination modes, logic circuit means connected to said light means for determining the illumination mode of said light means responsive to a count stopped signal, the count output of said counter, and to said oscillation signal outputs, and means for applying said count stopped signal, the count signal output of said counter, and the oscillation signal outputs of said oscillator means to the input of said logic circuit means.

2. An electronic random predictor system as recited in claim 1 wherein said light means includes lights which can be selectively illuminated to provide light in two colors, a first mode of illumination of the lights of said light means, as determined by said logic means, is illumination in one color, a second mode of illumination of the lights of said light means, as determined by said logic means, is illumination in a second color, a third mode of illumination of said light means, in response to said logic means, is a flashing on and off of said light means in light of one or the other of said two colors, and a fourth mode of illumination of the lights of said light means, as determined by said logic means, is an alternation between said two colors.

3. An electronic random predictor system as recited in claim 1 wherein said oscillator means includes means for providing a first, second and third pulse train, said first and second pulse trains having the same frequency but differing in phase, said third pulse train having a frequency which is a multiple of the frequencies of said first and second pulse trains, said light means includes a plurality of lights, said logic means includes means responsive to first predetermined count of said counter means for applying said third pulse train to selected ones of said plurality of lights in said light means, and means responsive to a second predetermined count of said counter means for alternately applying pulses from said first and second pulse trains to selected ones of the lights of said light means.

4. An electronic random predictor system as recited in claim 1 wherein said light means comprises three separate pairs of lights, each pair of lights comprising two different colors, said counter means comprises six binary stages, said logic circuit means including first gate means responsive to the binary state of said first and second stages when said counter means has stopped counting for determining the color and mode of illumination of said first pair of lights, second gate means responsive to the binary state of a third and fourth of said six binary stages when said counter means has stopped counting for determining the color and mode of illumination of said second pair of lights, and third gate means responsive to the binary state of a fifth and sixth of said binary stages, when said counter means has ceased counting to determine the color and mode of illumination of said third pair of lights.

5. An electronic random predictor system comprising a counter means producing count signal outputs, a first oscillator means, means for driving said counter means when enabled, player actuated means for connecting said oscillator means outputs for an interval determined by said player to enable said counter to count over said interval, and for producing a counter stopped signal when said counter stops counting, a second oscillator means for producing output oscillations, first, second, and third pairs of lights, each pair of lights being capable of producing light of one or the other of two colors, and logic circuit means responsive to the count output of said counter means, to said counter stopped signal, and to the output oscillations of said second oscillator means for determining which of the colors of said first, second, and third pairs of lights is to be illuminated and whether the illuminated ones of said first, second, and third pairs of lights is illuminated in a steady state mode, or in a flashing mode, or whether a pair of lights are alternately illuminated, and means for applying the count output of said counter means, said counter stopped signal of said player actuated means and the output oscillations of said second oscillator means to said logic circuit means input.

6. An electronic random predictor system as recited in claim 5 wherein said counter means comprises six serially connected binary states, said logic circuit means includes means responsive to the binary states of the first and second of said six binary stages for determining which of said first pair of lights is illuminated and the mode of said illumination, said logic circuit means includes means responsive to the binary states of the third and fourth of said six binary stages for determining which of said second pair of lights is illuminated and the mode of said illumination, and said logic circuit means includes means responsive to the fifth and sixth of said six binary stages of said counter means for determining which of said third pair of lights is illuminated and the mode of said illumination.

7. A random predictor electronic system comprising a plurality of light means, each consisting of at least two differently colored light sources;

logic circuit means having the output thereof connected to said light means;

a first oscillator means controlling a binary stage electronic counter means, the output of said counter means being one input of said logic circuit means;

a second oscillator means powered by a source of electric potential, the output of said second oscillator means being a second input of said logic circuit means;

a player actuated manually positionable switch connected to said potential source and to a flip-flop, said switch in a first position triggering one side of said flip-flop and in a second position triggering the second side of said flip-flop, the output of said first side of said flip-flop controlling said first oscillator means and the output of said second side of said flip-flop being a third input of said logic circuit means, whereby on positioning said switch in said first position the first oscillator means drives said counter means and the plurality of light means are not illuminated and on positioning said switch in said second position at least one of said plurality of light means is illuminated wherein at least one of said colored light sources in said illuminated light means is illuminated in either a steady state mode or a flashing mode, or at least two of said colored light sources in said illuminated light means are illuminated in an alternating blinking mode.

* * * * *